March 31, 1925.

G. L. PUGH

RIM EXPANDER AND CONTRACTOR

Filed Sept. 5, 1923

1,531,973

Inventor

Guy L. Pugh

By Alexander & Dowell

Attorneys

Patented Mar. 31, 1925.

1,531,973

UNITED STATES PATENT OFFICE.

GUY L. PUGH, OF ST. PAUL, VIRGINIA.

RIM EXPANDER AND CONTRACTOR.

Application filed September 5, 1923. Serial No. 660,990.

*To all whom it may concern:*

Be it known that I, GUY L. PUGH, a citizen of the United States, residing at St. Paul, in the county of Wise and State of Virginia, have invented certain new and useful Improvements in Rim Expanders and Contractors; and I hereby declare that the following is a full, clear, and exact description thereof, reference being had to the accompanying drawings, which form part of this specification.

This invention relates to new and useful improvements in rim expanders and contractors, and the principal object thereof is to provide novel and positive means for expanding or contracting the split rims of automobile wheels or the like, for use in mounting or removing pneumatic tires from the rim when it is desired to change a tire. My novel rim expander and contractor is adapted first to expand the rim to unlock the rim securing means preliminary to removing the tire therefrom; secondly, to contract the rim sufficiently to remove the tire therefrom; and thirdly, to then re-expand the rim, after a new tire has been mounted thereon, to re-lock the rim securing means, said rim expander and contractor being capable of use on various makes of split demountable rims for pneumatic tires.

Another object of the invention is to provide a novel rim expander and contractor which is of sturdy, durable, and of heavy construction which is adapted to be set up in garages, service stations and the like, and which is sufficiently strong to withstand abuse.

A further object of the invention is to provide a novel rim expander and contractor having a plurality of radially movable rim engaging members, each member being preferably provided on its outer end with a pair of rollers adapted to contact with the rim, whereby the expanding or contracting pressure will be uniformly distributed over the rim, and thereby eliminating the undesirable friction or binding at the points of contact of the radially movable members with the rim.

A still further object of the invention is to provide a novel pedal means for actuating the radially movable members, whereby the operator can exert any desired pressure or tension on the rim by pressing down on the pedal with his foot, leaving his hands free to manipulate the tire and rim, thereby insuring a satisfactory job in the shortest possible time without injury to the tire or rim.

A still further object is to provide means whereby the radially movable members will be positively locked in any position when the pedal is at rest, the parts being so designed that five to fifteen depressions of the pedal by the operator's foot will move the radially movable members from their extreme inner positions to their extreme outer positions, or vice versa.

Other minor objects of the invention will be hereinafter set forth.

I will explain the invention with reference to the accompanying drawings which illustrate a practical embodiment thereof to enable others to adopt and use the same, and will summarize in the claims the novel features of construction, and novel combinations of parts, for which protection is desired.

Figure 1:
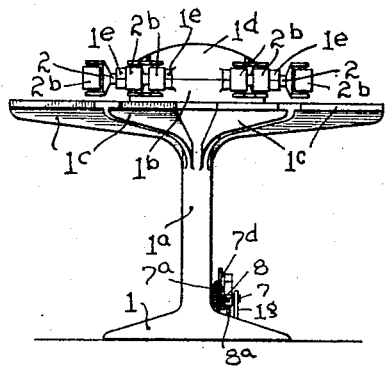
Fig. 1 is a side elevation of my novel rim expander and contractor.

As shown in the drawings, the machine comprises a stand carrying a plurality of radially movable rim engaging members 2 and means for forcibly actuating the members. The stand may be of any suitable kind, but preferably comprises a hollow base 1, from the upper face of which extends a hollow standard 1ª, and standard 1ª is provided at its upper end with a hollow enlarged head portion 1ᵇ. Base 1 and head portion 1ᵇ are preferably integral with the hollow standard 1ª, but may, if desired be separate therefrom and detachably attached thereto. A cover 1ᵈ is detachably mounted in any desired manner on the top of head portion 1ᵇ said cover 1ᵈ being preferably dome-shaped, and provided with a downwardly projecting stud 1ᶠ on the center thereof.

Projecting radially from the head portion 1ᵇ are a plurality of equi-distant arms 1ᶜ (six being shown) all disposed at the same elevation, and adapted to form a table to support a rim R when placed thereon concentric with the head $1^b$. Arms $1^c$ are preferably integral with the head $1^b$, but may be separate therefrom and detachably attached thereto.

Head $1^b$ is provided with horizontally disposed radial guides $1^e$, preferably one disposed above each arm $1^c$, said guides $1^e$ being adapted to receive the radially movable arms 2, and the guides $1^e$ and arms $1^c$ are preferably so disposed that when an automobile rim R is placed upon the arms $1^c$, the axis of the radially movable members 2 will bisect the rim R.

Figure 2:
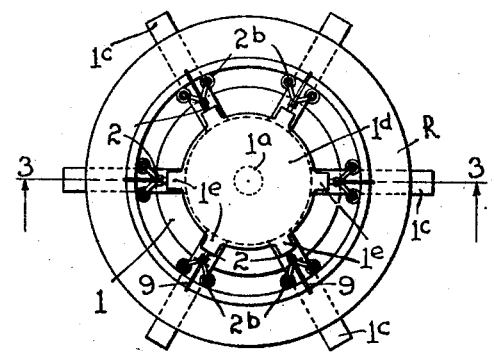
Fig. 2 is a top plan view of Fig. 1, showing in addition an automobile tire and rim mounted thereon in position to be operated upon by my novel expander and contractor.

The radially movable members 2 are preferably rectangular or square in cross-section and make a sliding fit within the guides $1^e$, said members 2 extending through both ends of the guides $1^e$. The outer end of each member 2 is preferably bifurcated, and each bifurcation is adapted to receive a vertically disposed pin $2^a$ upon which is mounted a roller $2^b$, adapted to engage the inner periphery of the rim R as shown in Fig. 2.

Figure 3:
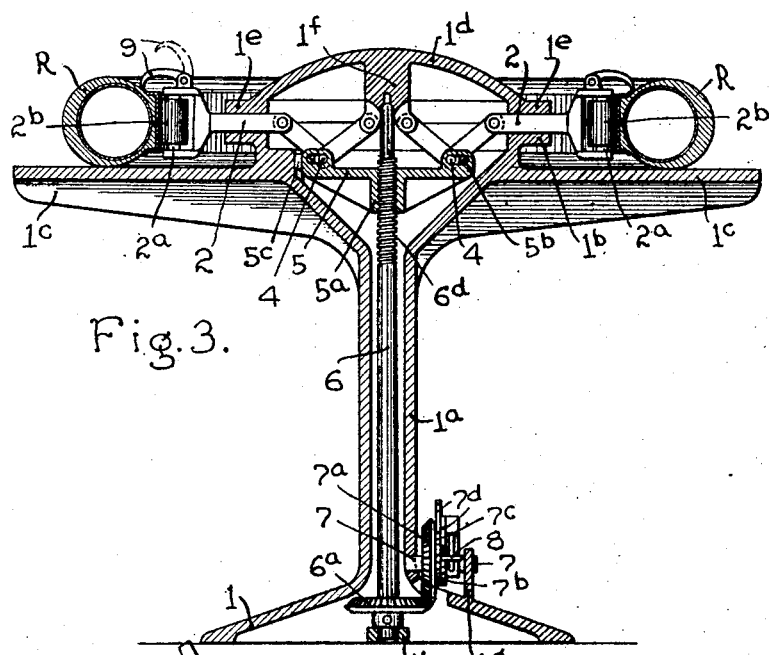
Fig. 3 is an enlarged detail vertical section through the axis of the machine, on the line 3—3 Fig. 2.

The inner end of each member 2 is pivotally connected to one end of a toggle as shown in Fig. 3 the other end of said toggle being pivotally attached to the stud $1^f$, and the toggle links are pivoted together at their adjacent meeting ends by a pin 4, which pin 4 also engages a slotted lug $5^b$ on a vertically movable disk 5, which disk 5, when raised or lowered will cause the toggle to expand or contract, and thereby move the members 2 radially in the guides $1^a$.

Vertically mounted within the stand is a screw shaft 6 having its upper end journaled in a suitable bearing in the stud $1^f$, and its lower end journaled in a bearing in a transversely disposed bar $1^k$ in the base 1, said shaft 6 having a threaded portion $6^d$ adapted to engage the internally threaded hub portion $5^a$ of the disk 5. By rotating shaft 6, the disk 5 will be raised or lowered; disk 5 being provided with suitable guides, as at $5^c$, to prevent said disk from rotating with the shaft 6 and thereby causing the disk to move axially of shaft 6 when said shaft is rotated.

The screw shaft 6 may be operated by any suitable means. As shown, a beveled gear $6^a$ keyed to the lower end of shaft 6 engages a beveled gear $7^a$ keyed to a horizontally disposed shaft 7 mounted in suitable bearing $1^g$ on the base 1. Also mounted on the shaft 7 is a pair of oppositely toothed ratchet wheels $7^b$, $7^c$, either of which ratchets may be engaged, at the will of the operator, with a double throw pawl $7^d$ mounted on a foot lever 8 which lever is pivoted on shaft 7. The foot lever 8 is adapted to be depressed by the operator's foot to cause the pawl $7^d$ to engage the ratchet $7^b$ (or $7^c$) to rotate the shafts 7 and 6 in the desired direction to raise or lower disk 5. Suitable springs $8^a$ may be provided whereby when the pedal is released the same will be raised to normal horizontal position.

Figure 4:
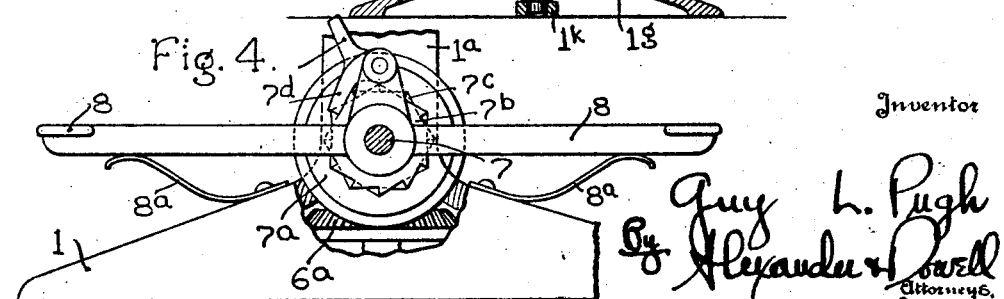
Fig. 4 is an enlarged detail end elevation, partly in section, of the pedal and ratchet.

The foot lever 8 preferably extends on both sides of the shaft 7, is loosely mounted thereon, and carries the double throw pawl $7^d$ which engages the ratchets $7^b$ or $7^c$. By depressing the part of pedal lever 8 which is disposed on the left-hand side of the shaft 7 (Fig. 4) with pawl $7^d$ thrown over to engage the ratchet wheel $7^c$, shaft 7 will be intermittently rotated in counter-clockwise direction with each depression of the lever 8, and when the operator's foot is removed from the pedal the spring $8^a$ will cause the pedal to return to its normally horizontal position. Similarly by depressing the part of lever 8 which is disposed on the right-hand side of shaft 7, with pawl $7^d$ thrown over to engage ratchet $7^b$, the shaft 7 will be rotated in the opposite or clockwise direction. Thus the disk 5 may be raised or lowered depending upon which end of pedal lever 8 is depressed by the operator's foot.

In operating the machine to forcibly expand the rim R, the disk 5 is first lowered on the screw shaft 6 by depressing pedal 8 to rotate shaft 7 in the proper direction causing the toggles to contract and retract the members 2 until rim R can be placed upon the supporting arms $1^c$, surrounding the rollers $2^b$ as indicated in Figs. 2 and 3. The disk 5 is then raised by properly rotating the screw 6, thereby expanding the toggles and forcing the members 2 outwardly, bringing the rollers $2^b$ thereof into engagement with the inner face of the rim R, and thus forcibly expanding the rim at equal distances apart to any desired extent. When the operations on the expanded rim are completed the disk 5 may be again lowered, thereby retracting the members 2, and permitting the rim R to contract until the rollers $2^b$ are clear of the rim R and the latter can be readily removed from the arms $1^c$.

The machine may also be used for forcibly contracting the rim R. For this purpose hooks 9 are provided, one hook 9 being preferably pivoted to the outer upper end of each of the members 2 as shown in Figs. 2 and 3 and adapted to be swung into engagement as shown in Fig. 3 with the outer face of the rim R. When hooks 9 are so engaged the disk 5 is lowered to contract the toggle, by rotating screw 6 in the proper direction.

The rim expander and contractor is of sufficiently heavy construction to withstand rough usage and abuse in a garage or service-station and preferably gears $6^a$ and $7^a$ the toggle and pitch of threads $6^a$ are all so proportioned that only from 5 to 15 depressions of a foot pedal 8 will be necessary to cause the slidable arms 2 to move a distance in either direction of about three or four inches, which extent of movement would be generally sufficient to handle a rim for either a 30 or 35 inch diameter tire. By using the toggle and screw means above described the members 2 will be positively locked in any position when the pedal 8 is at rest, and the power will be greatly increased or multiplied between the pedal 8 and members 2 by the nut 5, and the toggle joints. The position of the rollers 2$^b$ may be readily and easily changed however by depressing the pedal 8 to revolve the shaft 6 thereby raising or lowering the nut 5.

The pressure exerted by the members 2 will be uniformly distributed over the rim at the twelve points of contact of the rollers 2$^b$ with the rim R, and the undesirable binding at the points of contact of the machine with the rim is eliminated by providing a pair of rollers 2$^b$ on the end of each slidable arm 2, said rollers 2$^b$ being of sufficient size and shape to handle any standard split demountable rim. The toggle joints will cause the slidable members 2 to have uniform movement and power, and by applying the power by the operator's foot and desired pressure can be readily exterted on the rim leaving the operator's hands free to manipulate the tire and rim, and preferably only five to fifteen depressions on the pedal will do the work, depending on the pitch of the screw, and the position of the rollers 2$^b$ when commencing the expanding or contracting operation.

I claim:

1. In a rim expander and contractor, a support comprising a standard having a hollow head; a cover for said head having a depending lug; radially disposed guides in the head; radially movable rim engaging members mounted in said guides; sets of pivotally connected toggle links, one link of each set being pivotally connected to a member and the other link of each set being pivotally connected to said depending lug; a disk movably connected with the toggle links at their points of pivotal connection; and means for moving the said disk.

2. In a rim expander and contractor, a support comprising a standard having a hollow head; a cover for said head having a central depending lug; radially disposed rim supporting arms projecting from said head; radially disposed guides in said head above the arms; radially movable rim engaging members mounted in said guides; sets of pivotally connected toggle links, one link of each set having its outer end connected to a member and the other link of each set being pivotally connected to the depending lug; a disk pivotally connected with the points of pivotal connection of the toggle links; a rotatable screw shaft having a threaded portion engaging the disk to operate the latter; and means for rotating said shaft.

3. In a rim expander and contractor, a support comprising a base; a standard; a hollow head; radially disposed tire supporting arms projecting from said head; a cover for said head having a central depending lug; a plurality of radially disposed guides in said head above said arms; radially movable rim engaging members operating in said guides; an actuating disk; a plurality of sets of pivotally connected toggle links, one set for each rim engaging member; one link of each set being pivoted to said depending lug and the other link of each set being pivotally connected to a rim engaging member; said toggle links being movably connected to said disk at their points of pivotal connection; and pedal operated devices for moving said disk.

4. In a rim expander and contractor, a support comprising a base; a hollow standard; a hollow enlarged head; radially disposed tire supporting arms projecting from said head; a dome-shaped cover for said head having a central depending lug; a plurality of radially disposed guides in said head above said arms; radially movable rim engaging members operating in said guides; an actuating disk in said head; a plurality of sets of pivotally connected toggle links, one set for each rim engaging member; one link of each set being pivoted to said depending lug and the other link of each set being pivotally connected to a rim engaging member; said toggle links being movably connected to said disk at their points of pivotal connection; a rotatable screw shaft in said standard having a threaded portion engaging the disk; pedal operated devices for rotating said shaft; and means for preventing rotation of said disk.

5. In a rim expander and contractor, a support having a plurality of radially disposed guides therein; radially movable rim engaging members operating in said guides; an actuating disk having its axis at right angles to the axes of said members; means for preventing rotation of said disk; a plurality of sets of pivotally connected toggle links, one set being provided for each rim engaging member; one link of each set being pivoted to said support and the other link of each set being pivotally connected to a rim engaging member; said toggle links being movably connected to said disk at their points of pivotal connection; a rotatable screw shaft having a threaded portion engaging the disk; and pedal operated devices for rotating said shaft; said support comprising a hollow base adapted to house the lower end of said shaft; a hollow standard adapted to house said shaft; an enlarged hollow head adapted to house said disk and toggle links; radially disposed tire supporting arms projecting from said head below said guides; and a removable dome-shaped cover for said head, said cover having a central depending lug for attachment thereto of the inner ends of the toggle links, and having a bearing therein for the upper end of said shaft.

In testimony that I claim the foregoing as my own, I affix my signature.

GUY L. PUGH.